United States Patent
Tian

(10) Patent No.: US 11,381,102 B2
(45) Date of Patent: Jul. 5, 2022

(54) CHARGING MANAGEMENT CIRCUIT, TERMINAL AND CHARGING METHOD

(71) Applicant: GUANGDONG OPPO MOBILE TELECOMMUNICATIONS CORP., LTD., Guangdong (CN)

(72) Inventor: Chen Tian, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 195 days.

(21) Appl. No.: 16/620,858

(22) PCT Filed: Sep. 12, 2018

(86) PCT No.: PCT/CN2018/105178
§ 371 (c)(1),
(2) Date: Dec. 9, 2019

(87) PCT Pub. No.: WO2020/051790
PCT Pub. Date: Mar. 19, 2020

(65) Prior Publication Data
US 2021/0336465 A1    Oct. 28, 2021

(51) Int. Cl.
*H02J 7/16* (2006.01)
*H02J 7/04* (2006.01)
(Continued)

(52) U.S. Cl.
CPC ....... *H02J 7/007182* (2020.01); *H01M 10/44* (2013.01); *H02J 7/0047* (2013.01); *H02J 7/00714* (2020.01)

(58) Field of Classification Search
USPC .......................................................... 320/162
See application file for complete search history.

(56) References Cited

U.S. PATENT DOCUMENTS

| 6,124,698 A | * | 9/2000 | Sakakibara | ......... | H02J 7/00309 320/110 |
| 9,419,450 B2 | * | 8/2016 | Paryani | ................... | H02J 7/007 |

(Continued)

FOREIGN PATENT DOCUMENTS

| CN | 1845418 A | 10/2006 |
| CN | 1949620 A | 4/2007 |

(Continued)

OTHER PUBLICATIONS

Machine Translation of CN107612075A (Year: 2018).*

(Continued)

*Primary Examiner* — Samuel Berhanu
(74) *Attorney, Agent, or Firm* — Young Basile Hanlon & MacFarlane, P.C.

(57) ABSTRACT

A charging management circuit, a terminal and a charging method are provided. The charging management circuit includes: a first output end, configured to output constant current to a cell, for performing constant current charging on the cell; a second output end, configured to supply power to a load in a constant current charging process; and a control circuit, configured to stop the constant current charging when a voltage across both ends of the cell reaches a constant current charging cut-off voltage of the constant current charging, wherein the constant current charging cut-off voltage is greater than a rated voltage of the cell, and is configured such that an actual voltage of the cell is not overvoltage in the constant current charging process.

18 Claims, 2 Drawing Sheets

(51) Int. Cl.
*H02J 7/00* (2006.01)
*H01M 10/44* (2006.01)

(56) References Cited

U.S. PATENT DOCUMENTS

| | | | |
|---|---|---|---|
| 2007/0178376 A1* | 8/2007 | Fujikawa | H01M 10/44 429/144 |
| 2009/0027013 A1* | 1/2009 | Odaohhara | H02J 7/0068 320/160 |
| 2012/0104852 A1* | 5/2012 | Waltisperger | H02M 3/158 307/39 |
| 2013/0147277 A1* | 6/2013 | Popescu-Stanesti | H02M 3/00 307/66 |
| 2014/0175869 A1 | 6/2014 | Phillips et al. | |
| 2014/0184173 A1 | 7/2014 | Szepesi | |
| 2017/0126023 A1* | 5/2017 | Jung | H02J 7/0077 |
| 2017/0237346 A1* | 8/2017 | Toyama | H02M 3/158 323/271 |
| 2018/0102663 A1* | 4/2018 | Jung | H02J 7/042 |

FOREIGN PATENT DOCUMENTS

| | | |
|---|---|---|
| CN | 101636872 A | 1/2010 |
| CN | 101640296 A | 2/2010 |
| CN | 103107378 A | 5/2013 |
| CN | 103138022 A | 6/2013 |
| CN | 105262173 A | 1/2016 |
| CN | 105939040 A | 9/2016 |
| CN | 106887884 A | 6/2017 |
| CN | 107612075 A | 1/2018 |
| CN | 107768757 A | 3/2018 |
| CN | 107980191 A | 5/2018 |
| EP | 3285357 A1 | 2/2018 |

OTHER PUBLICATIONS

English translation of First OA for CN application 201880015957.X dated May 7, 2020.
English translation of Second OA for CN application 201880015957.X dated Jul. 27, 2020.
International Search Report with English translation issued in corresponding PCT application PCT/CN2018/105178 dated Mar. 27, 2019.
Communication pursuant to Article 94(3) EPC Examination for EP Application 18932874.1 dated Mar. 11, 2021.
Decision on Rejection with English Translation for CN application 201880015957.X dated Mar. 24, 2021.
OA for IN application 201917054198 dated Aug. 8, 2020.
OA for EP application 18932974.1 dated Sep. 24, 2020.
Third OA with English Translation for CN application 201880015957.X dated Nov. 26, 2020.
European Office Action for European Application No. 18932974.1 dated Aug. 11, 2021.
Chinese Decision on review with English Translation for Chinese Application 201880015957.X dated Nov. 5, 2021.
Chinese Notice of review with English Translation for Chinese Application 201880015957.X dated Sep. 16, 2021.
Summons to attend oral proceedings pursuant to Rule 115(1) EPC for EP Application 18932974.1 dated Jan. 25, 2022. (9 pages).

* cited by examiner

CHARGING MANAGEMENT CIRCUIT, TERMINAL AND CHARGING METHOD

CROSS-REFERENCE TO RELATED APPLICATION(S)

This application is a 371 application of International Application No. PCT/CN2018/105178, filed on Sep. 12, 2018, the entire disclosure of which is hereby incorporated by reference.

TECHNICAL FIELD

The present disclosure relates to a charging technology field, and more particularly, to a charging management circuit, a terminal and a charging method.

BACKGROUND

In the related art, a constant current and constant voltage mode is generally adopted to charge a cell. That is, the cell is first charged in a constant current mode, and when a voltage across both ends of the cell reaches a constant current charging cut-off voltage, a constant voltage charging stage is started. And in the constant voltage charging stage, the cell is charged with a high voltage, and the charging current of the cell is gradually reduced as the charging process proceeds. The charging is finished when the charging current of the cell reaches a constant voltage charging cut-off current.

In the above charging process, the constant voltage charging stage normally takes a long time, so that a charging speed of the cell is slow.

SUMMARY

In a first aspect, a charging management circuit is provided. The charging management circuit includes: a first output end, configured to output constant current to a cell, for performing constant current charging on the cell; a second output end, configured to supply power to a load in the constant current charging; and a control circuit, configured to stop the constant current charging when a voltage across both ends of the cell reaches a constant current charging cut-off voltage of the constant current charging, wherein the constant current charging cut-off voltage is greater than a rated voltage of the cell, and is configured such that an actual voltage of the cell is not overvoltage in the constant current charging.

In a second aspect, a terminal is provided. The terminal includes: a cell; a load; and a charging management circuit according to the first aspect.

In a third aspect, a charging method is provided. The charging method includes: performing constant current charging on the cell; supplying power to a load without drawing the power from a current entering into the cell; and stopping the constant current charging when a voltage across both ends of the cell reaches a constant current charging cut-off voltage of the constant current charging, wherein the constant current charging cut-off voltage is greater than a rated voltage of the cell, and is configured such that an actual voltage of the cell is not overvoltage in the constant current charging.

DETAILED DESCRIPTION

A cell mentioned in the present disclosure may refer to a cell of a lithium battery. The lithium battery may be a common lithium-ion battery or a polymer lithium-ion battery.

Typically, the cell is charged in a constant current and constant voltage mode. Specifically, a constant current charging may be first performed on the cell until a voltage across both ends of the cell is charged to a constant current charging cut-off voltage (the constant current charging cut-off voltage is generally set as a rated voltage of the cell). Then, a constant voltage charging may be performed on the cell with the constant current charging cut-off voltage as a charging voltage. As the charging process proceeds, a charging current of the cell is gradually reduced, and the charging is finished when the charging current of the cell reaches a constant voltage charging cut-off current.

Figure 1:
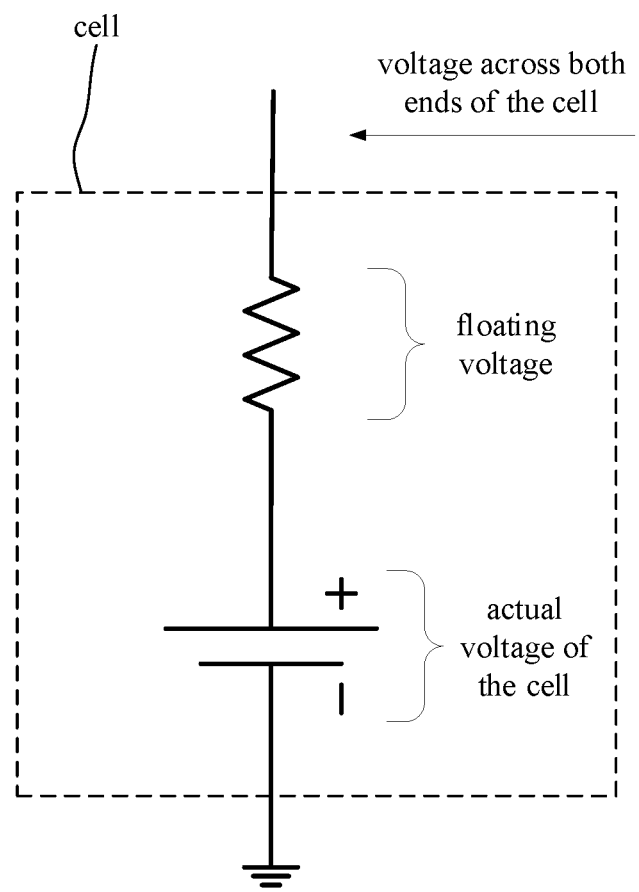
FIG. 1 is an equivalent model of a cell.

As illustrated in FIG. 1, in the charging process, the voltage across both ends of the cell typically includes two parts. The first part is the actual voltage of the cell, and the other part is a floating voltage caused by internal resistance of the cell. The actual voltage of the cell refers to a stable voltage between positive and negative electrodes of the cell. The internal resistance of the cell may include ohmic internal resistance (which is also called direct current resistance) and polarization resistance of the cell. The floating voltage caused by the internal resistance of the cell may also be referred to as a "virtual voltage" caused by the internal resistance of the cell.

In the constant current charging stage, as the charging current is great, the floating voltage of the cell is also great. When the voltage across both ends of the cell reaches the rated voltage of the cell, the actual voltage of the cell does not reach the rated voltage actually. In the constant voltage charging stage, the charging current is gradually reduced, and the floating voltage caused by the internal resistance of the cell is also gradually reduced. When the charging current of the cell is reduced to the constant voltage charging cut-off current, the floating voltage caused by the internal resistance of the cell is reduced to a negligible degree, and the actual voltage of the cell approximately reaches the rated voltage of the cell.

However, in the foregoing conventional charging method, the charging time of the constant voltage charging stage of the cell is long, resulting in a slow charging speed of the cell.

In order to increase the charging speed of the cell, the charging time of the constant current charging needs to be increased as much as possible. Experiments show that the cell will not be damaged as long as the actual voltage of the cell is not overvoltage in the charging process. Therefore, in the present disclosure, the constant current charging cut-off voltage is not set to be the rated voltage of the cell, but is set to be greater than the rated voltage of the cell, and the value of the constant current charging cut-off voltage may enable the actual voltage of the cell not to be overvoltage in the constant current charging process, so that the constant current charging time may be prolonged as much as possible. A determination method of the constant current charging cut-off voltage will be described in detail below with specific embodiments, and will not described in detail here.

In the constant current charging stage, the charging current of the cell is usually great. In order to avoid overheating of the whole machine, a power supply device (such as an adapter) may be adopted to perform direct charging on the cell. The direct charging means directly charging the cell through an external power supply device without passing through a charging management circuit. That is to say, in the direct charging process, an input current of the external power supply device may be directly applied to both ends of the cell, and the input current provided by the power supply device is not required to be converted by the charging management circuit, so that energy loss and heat generation caused by the conversion process are avoided.

However, when the power supply device performs the direct charging on the cell, if power consumption of a load of a terminal where the cell is located is high, much energy is drawn from the charging current of the cell to supply power to the load, which results in a very small current entering the cell.

As mentioned above, in the present disclosure, the constant current charging cut-off voltage is set to be greater than the rated voltage of the cell. If the power consumption of the load of the terminal is high, the current entering the cell is reduced, and thus the floating voltage of the cell is reduced, and most of the constant current charging cut-off voltage is applied to both ends of the cell. Consequently, the actual voltage of the cell is overvoltage, and the cell is possibly damaged.

Figure 2:
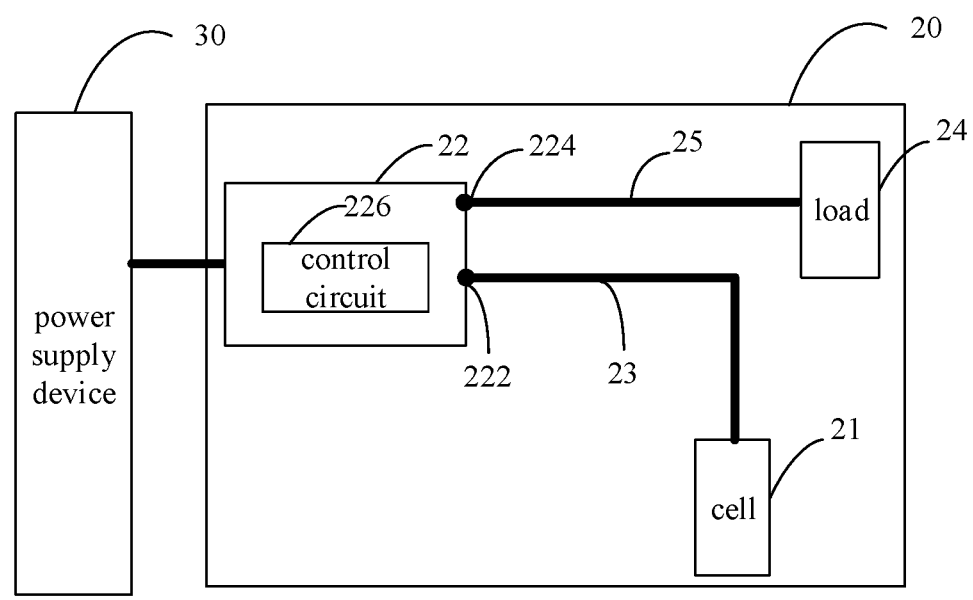
FIG. 2 is a schematic diagram of a terminal device according to an embodiment of the present disclosure.

In consideration of the above-mentioned problems that may exist in the direct charging scheme, in the constant current charging stage (or a part of the constant current charging stage) of the battery, the constant current charging is performed by using the charging management circuit in an embodiment of the present disclosure, so that the above-mentioned problems of the direct charging scheme can be avoided. With reference to FIG. 2, the embodiment of the present disclosure will be described in detail below by taking an example of charging the cell in the terminal.

As illustrated in FIG. 2, a terminal 20 may include a cell 21 and a charging management circuit 22. The cell 21 may include one cell unit or a plurality of cell units connected in series.

The charging management circuit 22 may be, for example, a charging management integrated circuit (IC), or referred to as a charging IC for short. The charging management circuit 22 may also be referred to as a charger in some cases. The charging control circuit 22 may receive an input current provided by an external power supply device 30 in a wired or wireless manner, and perform constant voltage and/or constant current charging on the cell 21 according to the input current provided by the power supply device 30.

The charging management circuit 22 may include a first output end 222, a second output end 224, and a control circuit 226.

The first output end 222 may be configured to output constant current to the cell 21, for performing constant current charging on the cell 21. As illustrated in FIG. 2, a channel between the first output end 222 and the cell 21 may be referred to as a charging channel 23. A charging current output from the first output end 222 may flow into the cell 21 through the charging channel 23, so as to charge the cell 21.

The second output end 224 may be configured to supply power to a load 24 in the constant current charging process of the cell 21. The load 24 may refer to a device in the terminal 20 that requires power, such as a processor, a sensor, etc. within the terminal. As illustrated in FIG. 2, a channel between the second output end 224 and the load 24 may be referred to as a power supply channel, and the second output end 224 may supply power to the load 24 through the power supply channel 25.

The control circuit 226 may be configured to stop the constant current charging when the voltage across both ends of the cell 21 reaches the constant current charging cut-off voltage of the constant current charging.

The constant current charging cut-off voltage may be greater than the rated voltage of the cell 21, and the configuration of the constant current charging cut-off voltage may enable the actual voltage of the cell 21 to be not overvoltage in the constant current charging process.

There may be various determination methods for determining the value of the constant current charging cut-off voltage, which is not limited in embodiments of the present disclosure. As an example, the constant current charging cut-off voltage may be determined empirically or experimentally. For example, in general, the constant current charging cut-off voltage $V_{thr}$ may be set to any voltage satisfying the following relationship: $0<V_{thr}-V_e<0.2V$, wherein $V_e$ represents the rated voltage of the cell 21.

As another example, the floating voltage of the cell 21 at various temperatures and charging currents may be experimentally measured in advance. For example, assuming that the rated voltage of the cell 21 is $V_e$, and the floating voltage of the cell 21 at a certain temperature and a certain charging current is experimentally measured as $V_f$, the constant current charging cut-off voltage $V_{thr}$ of the cell 21 at the temperature and the charging current may be set to any voltage satisfying the following condition: $V_e<V_{thr}\leq V_e+V_f$, wherein $V_e$ represents the rated voltage of the cell 21.

Further, in some embodiments, the constant current charging cut-off voltage may be configured such that when the voltage across both ends of the cell 21 is charged to the constant current charging cut-off voltage, the actual voltage of the cell is equal to the rated voltage of the cell.

For example, assuming that the rated voltage of the cell 21 is $V_e$, and the floating voltage of the cell 21 at a certain temperature and a certain charging current is experimentally measured as $V_f$, the constant current charging cut-off voltage $V_{thr}$ of the cell 21 at the temperature and the charging current may be set to $V_e+V_f$. In this manner, when the voltage across both ends of the cell 21 reaches $V_{thr}$, the actual voltage across both ends of the cell 21 is $V_e$, which indicates that the cell 21 is fully charged, and the constant voltage charging is not required, so that the charging speed of the cell 21 is increased to a greater extent.

Unlike the direct charging scheme, when the constant current charging is performed with the charging management circuit 22, the load 24 of the terminal 20 does not take electricity from the current entering the cell 21, but takes electricity from the external power supply device 30 through the second output end 224 of the charging management circuit 22. Therefore, as long as the input current provided by the power supply device 30 is ensured to be sufficiently great (for example, greater than a sum of the current required for supplying power to the load 24 and the charging current of the battery), even if the power consumption of the load 24 is large, the charging current entering the cell 21 is not affected, thereby effectively avoiding a problem that the cell 21 is overcharged for the reason that the charging current entering the cell 21 is reduced due to an excessive power consumption of the load 24.

As mentioned above, the distribution of the floating voltage of the cell 21 at various temperatures (e.g., the temperature of the cell) and charging currents may be measured in advance through experiments. And then, in the actual charging process, the constant current charging cut-off voltage may be determined according to the present temperature (such as the present temperature of the cell) and charging current by using above-mentioned prior information, so that the constant current charging cut-off voltage is greater than the rated voltage of the cell, and the actual voltage of the cell is not overvoltage in the constant current charging process.

As a possible implementation, a mapping relationship (hereinafter, referred to as a first mapping relationship) among the temperature, the charging current of the cell and the floating voltage of the cell may be established according to experiments. The first mapping relationship may be, for example, a mapping relationship table. In the actual charging process, the control circuit 226 may determine the floating voltage of the cell 21 in the constant current charging process according to the present temperature, the charging current corresponding to the constant current charging, and the first mapping relationship established in advance; and determine the constant current charging cut-off voltage according to the floating voltage of the cell 21 in the constant current charging process.

For example, assuming that it is measured in advance through experiment that the floating voltage of the cell 21 is 0.5V when the temperature is 35° C. and the charging current is 1 A, then a mapping relationship among these three may be established. In the actual charging process, if the charging current of the constant current charging is 1 A and the temperature of the cell 21 is 35° C., it is determined that the floating voltage of the cell 21 at this time is 0.5V by querying the mapping relationship established in advance. Assuming that the rated voltage of the cell 21 is 4.25V, the constant current charging cut-off voltage may be determined to be 4.75V.

As another possible implementation, a mapping relationship (hereinafter, referred to as a second mapping relationship) among the temperature, the charging current of the cell, and the constant current charging cut-off voltage may also be established directly according to experiments. The second mapping relationship may be, for example, a mapping relationship table. In the actual charging process, the control circuit 226 may directly determine the constant current charging cut-off voltage according to the present temperature, the charging current corresponding to the constant current charging, and the second mapping relationship established in advance.

For example, assume that it is measured in advance through experiment that the floating voltage of the cell 21 is 0.5V when the temperature is 35° C. and the charging current is 1 A. Since the rated voltage of the cell 21 is 4.25V, the constant current charging cut-off voltage may be set to 4.75V. In the actual charging process, if the charging current of the constant current charging is 1 A and the temperature of the cell 21 is 35° C., the constant current charging cut-off voltage is directly determined to be 4.75V by querying the mapping relationship established in advance.

Embodiments of the present disclosure also provide the terminal 20 illustrated in FIG. 2. The terminal may include, but is not limited to, a device configured to receive/transmit communication signals via wired connection (for example, public switched telephone network (PSTN), digital subscriber line (DSL), digital cable, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The terminal configured to communicate via the wireless interface may be referred to as "wireless communication terminal", "wireless terminal" and/or "mobile terminal". Examples of the mobile terminal include, but are not limited to a satellite phone or a cell phone, a terminal combining a cell radio phone and a personal communication system (PCS) having capability of data process, fax, and data communication, a personal digital assistant (PDA) including a radio phone, a pager, an Internet/Intranet access, a web browser, a notepad & address book, a calendar and/or a global positioning system (GPS) receiver, and a common laptop and/or handheld receiver, or other electronic devices including a radio phone transceiver.

Figure 3:
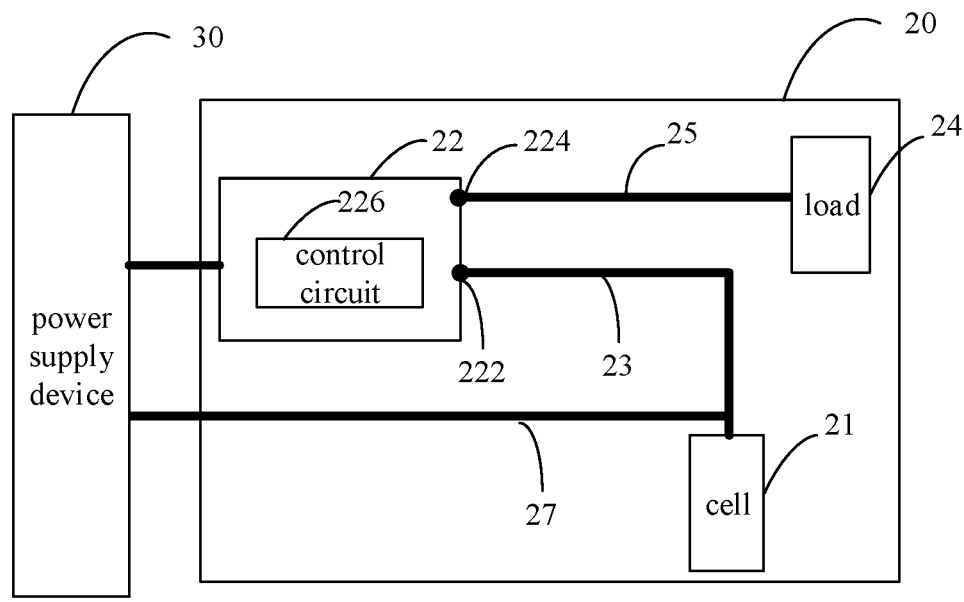
FIG. 3 is a schematic diagram of a terminal device according to another embodiment of the present disclosure.

As illustrated in FIG. 3, the terminal 20 may also include a fast charging channel 27. In contrast, the charging channel 23 between the first output end 222 of the charging management circuit 22 and the cell 21 may be referred to as a normal charging channel.

The fast charging channel 27 may perform the direct charging on the cell 21 with the input current supplied from the external power supply device 30. The fast charging channel 27 may perform constant current charging on the cell 21 with a large current before the constant current charging is performed on the cell 21 with the normal charging channel 23.

Therefore, in the embodiment of the present disclosure, the constant current charging stage is divided into two different stages, namely, a stage of performing the constant current charging by using the fast charging channel 27 (hereinafter, referred to as a first constant current charging stage), and a stage of performing the constant current charging by using the normal charging channel 23 (hereinafter, referred to as a second constant current charging stage). In the first constant current charging stage, a relatively large charging current may be selected first, and direct charging is performed on the cell 21 through the fast charging channel 27, without using the charging management circuit 22 to convert the input voltage and/or the input current provided by the power supply device 30, so that the heat generated by the whole machine is small. Moreover, since the charging current on the fast charging channel 27 is large, even if the power consumption of the load of the terminal 20 is large, the proportion of the current drawn by the load from the charging current may be small. Therefore, the possibility of overvoltage of the cell 21 is relatively small.

After the first constant current charging stage is completed, the second constant current charging stage may be entered. A small charging current (e.g., 1 A or less than 1 A) is selected to perform the constant current charging on the cell 21 with the normal charging channel 23. At this time, since the load directly takes electricity from the power supply device 30, the charging current into the cell 21 is not reduced, and the problem of overvoltage does not occur, as long as it is ensured that the input current provided by the power supply device 30 is sufficiently large. To sum up, the embodiment of the present disclosure may effectively prevent the cell from being overvoltage on the premise of improving the charging speed.

Device embodiments of the present disclosure are described in detail above in combination with FIGS. 1 to 3, and method embodiments of the present disclosure will be described in detail below in combination with FIG. 4. It is to be understood that the description of the method embodiments corresponds to the description of the device embodiments, and therefore, for parts not described in detail, reference can be made to the foregoing device embodiments.

Figure 4:
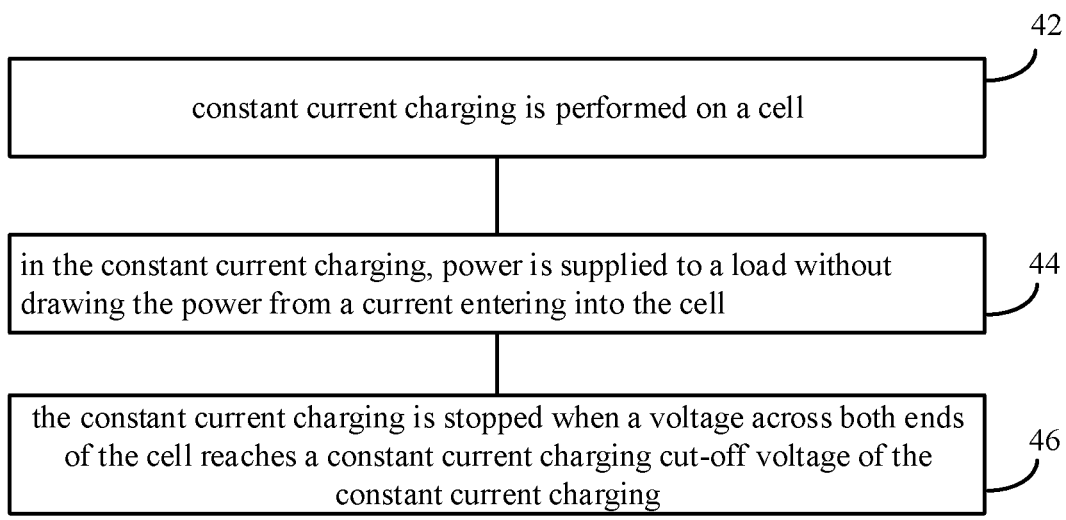
FIG. 4 is a schematic flow chart of a charging method according to an embodiment of the present disclosure.

FIG. 4 is a schematic flow chart of a charging method according to an embodiment of the present disclosure. The method of FIG. 4 may include blocks 42 to 46. These blocks may be performed by the charging management circuit 22 as described above.

At block 42, constant current charging is performed on a cell.

For example, constant current charging is performed on the cell by using the first output end of the charging management circuit as described above.

At block 44, in the constant current charging process, power is supplied to a load without drawing the power from a current entering into the cell.

For example, in the constant current charging process, power is supplied to the load by using the second output end of the charging management circuit.

At block 46, the constant current charging is stopped when a voltage across both ends of the cell reaches a constant current charging cut-off voltage of the constant current charging, wherein the constant current charging cut-off voltage is greater than the rated voltage of the cell, and is configured such that the actual voltage of the cell is not overvoltage in the constant current charging.

In an embodiment, the constant current charging cut-off voltage is determined based on a floating voltage of the cell in the constant current charging process.

In an embodiment, the method in FIG. 4 further includes: determining the floating voltage of the cell in the constant current charging process according to a present temperature, a charging current corresponding to the constant current charging and a first mapping relationship established in advance, the first mapping relationship being a mapping relationship among the temperature, the charging current of the cell and the floating voltage of the cell; and determining the constant current charging cut-off voltage according to the floating voltage of the cell in the constant current charging process.

In another embodiment, the method in FIG. 4 further includes: determining the constant current charging cut-off voltage according to the present temperature, the charging current corresponding to the constant current charging and a second mapping relationship established in advance, the second mapping relationship being a mapping relationship among the temperature, the charging current of the cell and the constant current charging cut-off voltage.

In some embodiments, the constant current charging cut-off voltage is configured such that when the voltage across both ends of the cell is charged to the constant current charging cut-off voltage, the actual voltage of the cell is equal to the rated voltage of the cell.

The method in FIG. 4 may further include: performing the constant current charging on the cell in a fast charging mode before performing the constant current charging on the cell in a normal charging mode. In the fast charging mode, direct charging is performed on the cell by using the input current provided by the power supply device. The charging current of the constant current charging in the fast charging mode is greater than the charging current of the constant current charging in the normal charging mode.

In above embodiments, it is possible to implement the embodiments fully or partially by software, hardware, firmware or any other combination. When implemented by software, it is possible to implement the embodiments fully or partially in a form of computer program products. The computer program product includes one or more computer instructions. When the computer program instructions are loaded and executed by the computer, procedures or functions according to embodiments of the present disclosure are fully or partially generated. The computer may be a general-purpose computer, a special-purpose computer, a computer network, or any other programmable device. The computer instructions may be stored in a computer readable storage medium, or may be transmitted from one computer readable storage medium to another computer readable storage medium. For example, the computer instructions may be transmitted from one website, computer, server or data center to another website, computer, server or data center in a wired manner (for example, via coaxial cables, fiber optics, or DSL (digital subscriber line)) or in a wireless manner (for example, via infrared, WiFi or microwave). The computer readable storage medium may be any available medium that are accessible by the computer, or a data storage device such as a server or a data center integrated with one or more available medium. The available medium may be magnetic medium (for example, floppy disk, hard disk and tape), optical medium (for example, DVD (digital video disc)), or semiconductor medium (for example, SSD (solid state disk)).

Those skilled in the art could be aware that, example units and algorithm steps described in combination with embodiments disclosed herein may be implemented by electronic hardware, or by a combination of computer software and electronic hardware. Whether these functions are executed by hardware or software is dependent on particular use and design constraints of the technical solutions. Professionals may adopt different methods for different particular uses to implement described functions, which should not be regarded as going beyond the scope of the present disclosure.

In several embodiments provided by the present disclosure, it should be understood that, the disclosed system, device and method may be implemented in other ways. For example, the device embodiments described above are merely illustrative. For example, the units are merely divided according to logic functions, and can be divided in other ways in actual implementation. For example, a plurality of units or components may be combined or may be integrated into another system, or some features may be ignored or not executed. In addition, the mutual coupling or direct coupling or communication connection illustrated or discussed may be via some interfaces, or direct coupling or communication connection of devices or units may be in an electrical, mechanical, or other form.

The units described as separate parts may or may not be physically separated. Parts displayed as units may or may not be physical units, i.e., the parts may be located in one place, or may be distributed on a plurality of network units. Some or all of the units can be selected according to actual needs to achieve purposes of solutions of the embodiments.

Moreover, respective functional units in respective embodiments of the present disclosure may be integrated in one processing unit, or the respective units may be separate physical existence, or two or more units may be integrated in one unit.

Above description is merely specific implementation of the present disclosure. However, the protection scope of the present disclosure is not limited to this. Any change or substitute that is conceivable by those skilled in the art should be in the protection scope of the present disclosure.

Thus, the protection scope of the present disclosure should be defined as the protection scope of claims.

What is claimed is:

1. A charging management circuit, comprising:
a first output end, configured to, in a second constant current charging stage of a constant current charging process, output constant current to a cell, for performing constant current charging on the cell through a normal charging channel between the first output end and the cell, wherein the constant current charging process further comprises a first constant current charging stage, wherein in the first constant current charging stage, a fast charging channel between a power supply device and the cell is configured to perform constant current charging on the cell before performing the constant current charging on the cell via the normal charging channel, wherein the fast charging channel is capable of performing direct charging on the cell by using an input current provided by the power supply device, and wherein a charging current of the constant current charging on the fast charging channel is greater than a charging current of the constant current charging on the normal charging channel;
a second output end, configured to supply power to a load during the constant current charging; and
a control circuit, configured to stop the constant current charging when a voltage across both ends of the cell reaches a constant current charging cut-off voltage of the constant current charging, wherein the constant current charging cut-off voltage is greater than a rated voltage of the cell, and is configured such that an actual voltage of the cell is not overvoltage in the constant current charging.

2. The charging management circuit according to claim 1, wherein the constant current charging cut-off voltage is determined based on a floating voltage of the cell in the constant current charging.

3. The charging management circuit according to claim 2, wherein the control circuit is further configured to:
determine the floating voltage of the cell in the constant current charging according to a present temperature, a charging current corresponding to the constant current charging and a first mapping relationship established in advance, the first mapping relationship being a mapping relationship among the temperature, the charging current of the cell and the floating voltage of the cell; and
determine the constant current charging cut-off voltage according to the floating voltage of the cell in the constant current charging.

4. The charging management circuit according to claim 2, wherein the control circuit is further configured to:
determine the constant current charging cut-off voltage according to a present temperature, the charging current corresponding to the constant current charging and a second mapping relationship established in advance, the second mapping relationship being a mapping relationship among the temperature, the charging current of the cell and the constant current charging cut-off voltage.

5. The charging management circuit according to claim 1, wherein the constant current charging cut-off voltage is configured such that when the voltage across both ends of the cell is charged to the constant current charging cut-off voltage, the actual voltage of the cell is equal to the rated voltage of the cell.

6. A terminal, comprising:
a cell;
a load;
a charging management circuit, comprising:
a first output end, configured to, in a second constant current charging stage of a constant current charging process, output constant current to the cell, for performing constant current charging on the cell through a normal charging channel between the first output end and the cell;
a second output end, configured to supply power to the load during the constant current charging; and
a control circuit, configured to stop the constant current charging when a voltage across both ends of the cell reaches a constant current charging cut-off voltage of the constant current charging, wherein the constant current charging cut-off voltage is greater than a rated voltage of the cell, and is configured such that an actual voltage of the cell is not overvoltage in the constant current charging; and
a fast charging channel,
wherein the constant current charging process further comprises a first constant current charging stage, wherein in the first constant current charging stage, a fast charging channel between a power supply device and the cell is configured to perform constant current charging on the cell before performing the constant current charging on the cell via the normal charging channel, wherein the fast charging channel is capable of performing direct charging on the cell by using an input current provided by the power supply device, and wherein a charging current of the constant current charging on the fast charging channel is greater than a charging current of the constant current charging on the normal charging channel.

7. The terminal according to claim 6, wherein the constant current charging cut-off voltage is determined based on a floating voltage of the cell in the constant current charging.

8. The terminal according to claim 7, wherein the control circuit is further configured to:
determine the floating voltage of the cell in the constant current charging according to a present temperature, a charging current corresponding to the constant current charging and a first mapping relationship established in advance, the first mapping relationship being a mapping relationship among the temperature, the charging current of the cell and the floating voltage of the cell; and
determine the constant current charging cut-off voltage according to the floating voltage of the cell in the constant current charging.

9. The terminal according to claim 7, wherein the control circuit is further configured to:
determine the constant current charging cut-off voltage according to a present temperature, the charging current corresponding to the constant current charging and a second mapping relationship established in advance, the second mapping relationship being a mapping relationship among the temperature, the charging current of the cell and the constant current charging cut-off voltage.

10. The terminal according to claim 6, wherein the constant current charging cut-off voltage is configured such that when the voltage across both ends of the cell is charged to the constant current charging cut-off voltage, the actual voltage of the cell is equal to the rated voltage of the cell.

11. The terminal according to claim 6, wherein the load comprises a processor and a sensor.

12. The terminal according to claim 6, further comprising:
a power supply channel between the second output end and the load, wherein the second output end is configured to supply power to the load via the power supply channel during the constant current charging.

13. The terminal according to claim 6, wherein the cell comprises a plurality of cell units connected in series.

14. A charging method, comprising:
in a second constant current charging stage of a constant current charging process, performing constant current charging on a cell through a normal charging channel between a first output end of a charging management circuit and the cell, wherein the constant current charging process further comprises a first constant current charging stage;
supplying power to a load without drawing the power from a current entering into the cell;
stopping the constant current charging when a voltage across both ends of the cell reaches a constant current charging cut-off voltage of the constant current charging, wherein the constant current charging cut-off voltage is greater than a rated voltage of the cell, and is configured such that an actual voltage of the cell is not overvoltage in the constant current charging; and
in the first constant current charging stage, performing constant current charging on the cell via a fast charging channel between a power supply device and the cell before performing the constant current charging on the cell via the normal charging channel, wherein the fast charging channel is capable of performing direct charging on the cell by using an input current provided by the power supply device, and wherein a charging current of the constant current charging on the fast charging channel is greater than a charging current of the constant current charging on the normal charging channel.

15. The charging method according to claim 14, wherein the constant current charging cut-off voltage is determined based on a floating voltage of the cell in the constant current charging.

16. The charging method according to claim 15, further comprising:
determining the floating voltage of the cell in the constant current charging according to a present temperature, a charging current corresponding to the constant current charging and a first mapping relationship established in advance, the first mapping relationship being a mapping relationship among the temperature, the charging current of the cell and the floating voltage of the cell; and
determining the constant current charging cut-off voltage according to the floating voltage of the cell in the constant current charging.

17. The charging method according to claim 15, further comprising:
determining the constant current charging cut-off voltage according to a present temperature, the charging current corresponding to the constant current charging and a second mapping relationship established in advance, the second mapping relationship being a mapping relationship among the temperature, the charging current of the cell and the constant current charging cut-off voltage.

18. The charging method according to claim 14, wherein the constant current charging cut-off voltage is configured such that when the voltage across both ends of the cell is charged to the constant current charging cut-off voltage, the actual voltage of the cell is equal to the rated voltage of the cell.

* * * * *